INVENTORS
FRANK A. MAROVICH
JEAN BORDEAUX &
DONALD W. SAWTELLE

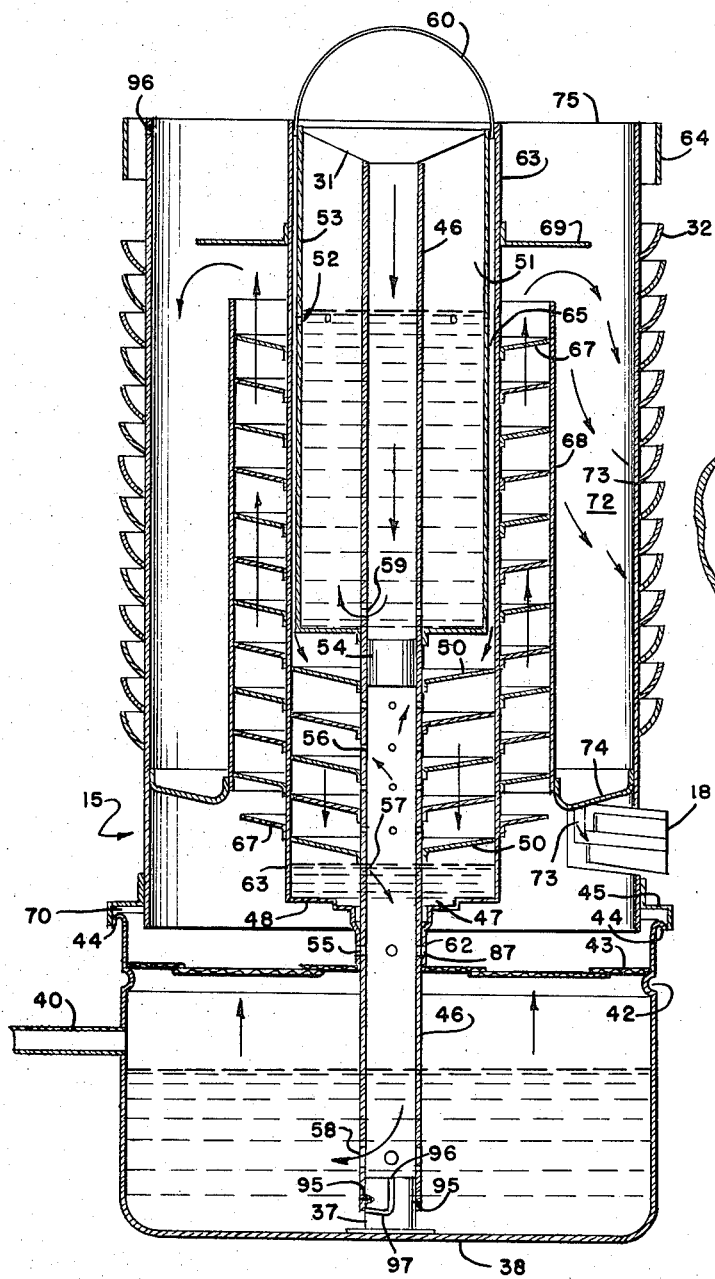
FIG. 2
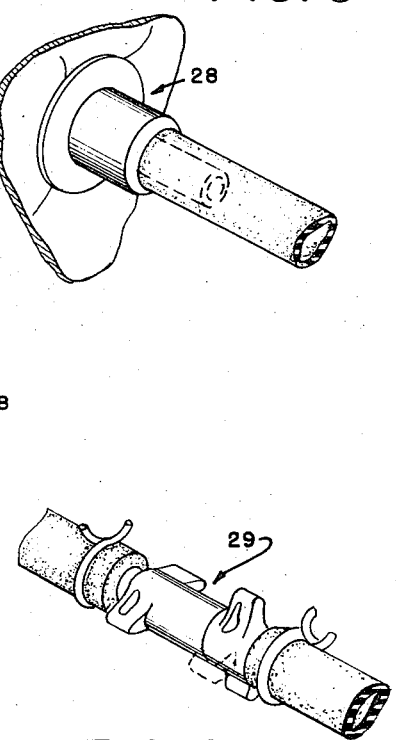
FIG. 5
FIG. 6
INVENTORS
FRANK A. MAROVICH
JEAN BORDEAUX &
DONALD W. SAWTELLE
BY Charles K Wright
ATTORNEY Sept. 26, 1972  F. A. MAROVICH ET AL  3,694,321
PORTABLE DISTILLATION UNIT
Filed Nov. 3, 1970  3 Sheets-Sheet 3

BY Charles K Wright Jr
ATTORNEY 3,694,321
Patented Sept. 26, 1972

3,694,321
PORTABLE DISTILLATION UNIT
Frank A. Marovich, Hacienda Heights, Jean Bordeaux, Fullerton, and Donald W. Sawtelle, Anaheim, Calif., assignors to the United States of America as represented by the Secretary of the Army
Filed Nov. 3, 1970, Ser. No. 86,579
Int. Cl. B01d 3/00
U.S. Cl. 202—83    12 Claims

ABSTRACT OF THE DISCLOSURE

A portable stainless steel water distillation unit capable of producing pyrogen-free water in a single distillation. A filtering section permits the use of deionizing resin or activated charcoal. A series of baffles permit the incoming water to be preheated by a portion of the steam. Another series of baffles filter out particulate matters from the steam on its way to the condensation chamber where it is effectively cooled but isolated from the feed water. The relationship of the elements enables the compact, durable unit to function at maximum thermal efficiency.

---

The invenion herein described was made in the course of or under a contract or subcontract thereunder with the Department of the Army.

BACKGROUND OF THE INVENTION

(1) Field of the invention

The distillation unit produces pyrogen-free water for all pure water uses, including medical, and because of its durability, is especially suited for field hospital use.

(2) Description of the prior art

Most water purification units available today are large systems, often constructed primarily of glass and are difficult to maintain. Metal stills have not been capable of producing low conductivity water in a single distiillaton, while on the other hand, units capable of producing pyrogen-free water for medical purposes have not been designed with durability in mind and are consequently not suited for medical use in remote areas.

SUMMARY OF THE INVENTION

The distillation unit, of stainless steel construction, produces from a single distillation up to a gallon per hour of sterile, pyrogen-free water by U.S. Pharmacoepia Standards for sterile injection water.

The complete system comprises a distillation unit, water quality monitor attachment, autoclave set and electrolyte reconstitution plastic sets. Local heat sources may be used.

The unit's unique design permits feed water to be effectively preheated though isolated from steam which, when condensed, will be the product. During this time noncondensable gases are driven off from the feed water.

The condensation chamber is positioned to take maximum advantage of the use of inexpensive cooling water. The cooling water is far enough removed from the boiler and preheat section so as not to interfere with these functions.

Baffles are placed along water and steam routes to serve a effective filters and their construction and positioning permit them to be self-cleaning.

The positioning of these elements in primarily a concentric arrangement with respect to one another permits the unit to operate at an efficiency not previously possible in metal units of this relative size and compactness.

It is an object of the invention to provide a distillation unit which is capable of producing low conductivity water from a single distillation.

It is a further object of the invention to provide a distillation unit that can utilize any available heat source.

It is a still further object of the invention to provide a small, durable distillation unit for use in remote areas, yet one which can produce water for intravenous solutions for medical use.

It is another object of the invention to provide a distillation unit which is easily disassembled for cleaning.

BRIEF DESCRIPTION OF THE DRAWINGS

FIG. 2 is a cross-sectional view of the distillation unit showing the flow of fluid and vapor through the unit;
FIG. 4 is a view of the distillation unit disasembled;
FIG. 5 is a perspective view of a water bag connection;
and
FIG. 6 is a perspective view of a flow valve.

DESCRIPTION OF THE PREFERRED EMBODIMENT

Figure 1:
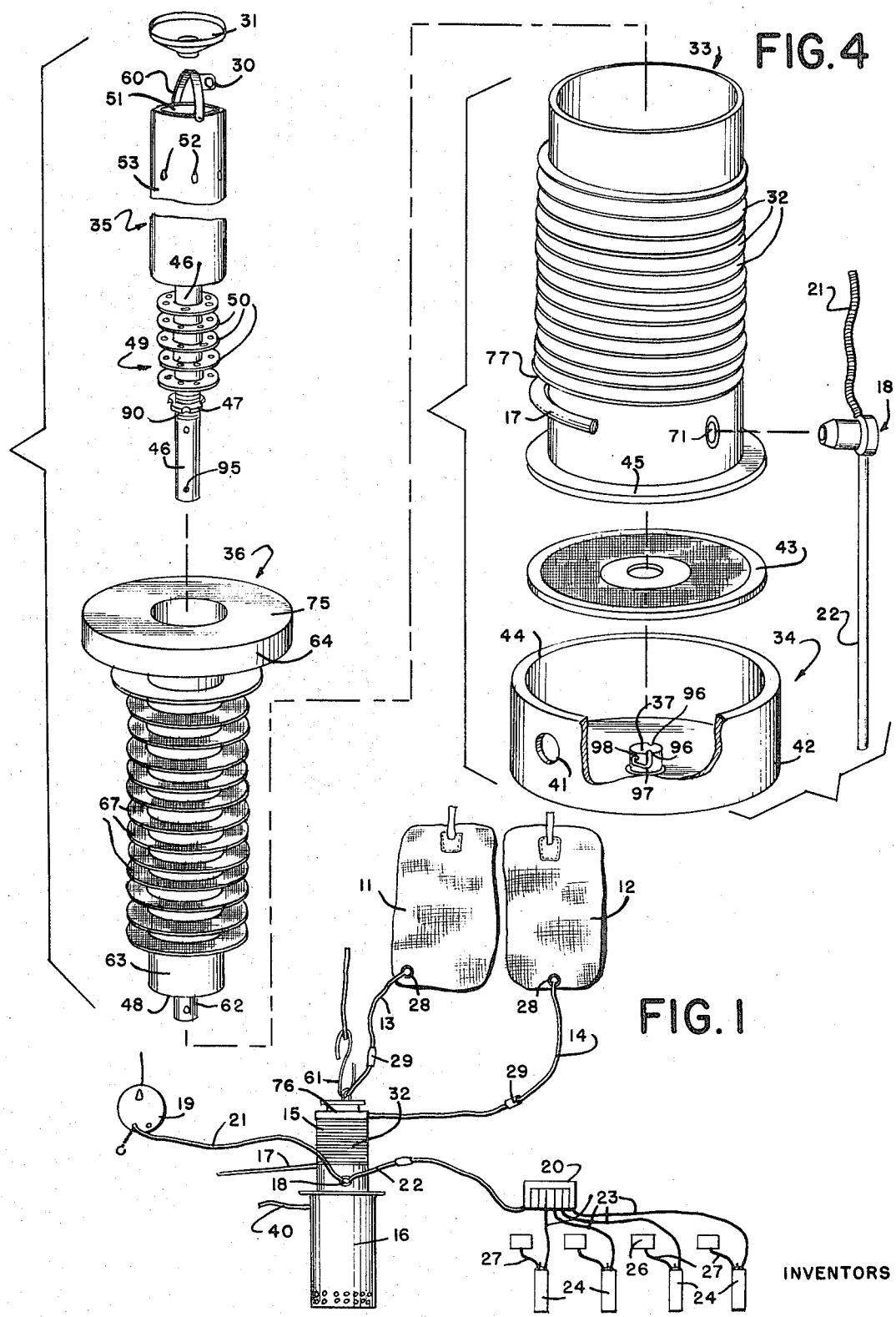
FIG. 1 is a view of the distillation system, using the distillation unit, assembled for operation.
Figure 3:
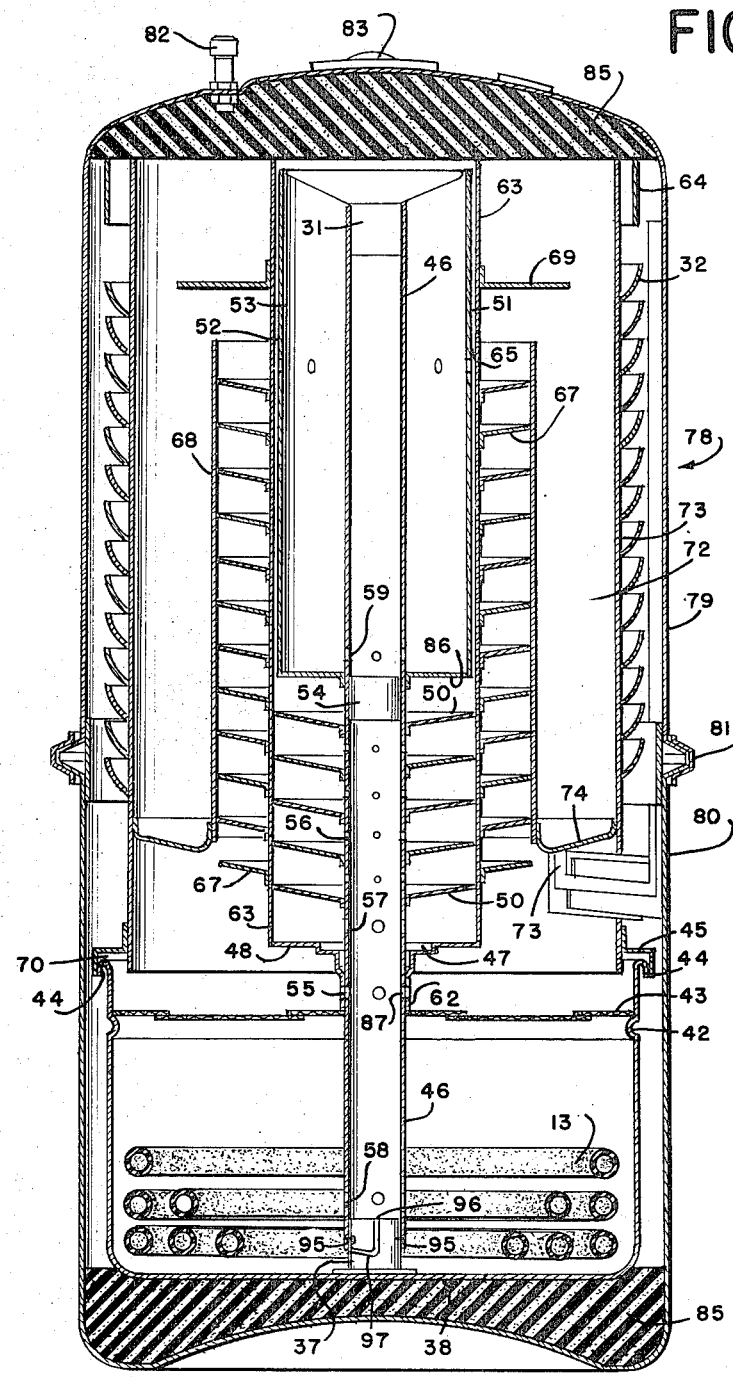
FIG. 3 is a cross-sectional view of the distillation unit when assembled as an autoclave.

The portable distillation system in operation is shown in FIG. 1. A feedwater bag 11 and a cooling water bag 12 are hung above, and connected by tubing 13, 14 to the distillation unit 15 which is placed on any local heat source 16. The distillation unit 15 has connected to it, a cooling water output tube 17 and a conductivity cell 18. A quality monitor 19 and a manifold 20 are connected respectively to the conductivity cell 18 by a cable 21 and a distillate discharge tube 22. The manifold 20 is connected by tubes 23 to autoclave cannisters 24 containing solution bags, not shown. Air pouches 26, which must be elevated above the cannisters 24, are connected to each solution bag by tubes 27.

The feedwater input tubing 13 and the cooling water input tubing 14 are connected to their respective water bags 11, 12 by standard cylindrical connector means 28 as depicted in FIG. 5. The tubing 13, 14 has standard flow valves 29 of the variety illustrated in FIG. 6. The feedwater tubing 13 enters the distillation unit 15 and is secured by the water inlet tube holder 30. Water is thus channeled into the inlet water funnel 31. The cooling water tubing 14 from the cooling water bag 12 is connected to the receiving end 76 of the cooling water open trough 32 of the distillation unit condenser assembly 33.

Referring to FIG. 4, the distillation unit has a boiler 34 which is placed over a heat source. The central locking and inlet assembly 35 is placed inside the demister assembly 36; the condenser assembly 33 is secured to the top of the boiler 34; and the demister assembly 36, with the central locking and inlet assembly 35 inside; is placed into the condenser assembly 33 with the lower end of the central locking and inlet assembly 35 extending down into the boiler 34 and engaging an upstanding support pedestal 37 on the bottom of the boiler 34 and with the upper end of the demister assembly 36 fitting over the top of the condenser assembly 33. The conductivity cell 18 is secured in the condenser assembly 33 as is the cooling water output tube 17. The overflow tube 40 is inserted into the boiler 34 and the inlet water funnel 31 is secured in the upper end of the tubular member 46 of the central locking and inlet assembly 35.

The boiler has an upstanding support pedestal 37 extending upward from the center of its bottom around which the base portion of the central locking and inlet assembly 35 engages. An overflow tube connector 41 is located on the side of the boiler 34 for the insertion of the overflow tube 40.

An inward notch 42, see FIG. 2, around the boiler 34 supports the circular splash screen 43 which is placed inside the boiler 34. The top of the boiler 34 curls outward to form a lip 44 to support the base 45 of the condenser assembly 33.

The central locking and inlet assembly 35 has a tubular member 46 which engages the boiler lug 37. A vertical positioning spacing nut 47 engages threads 90 around the circumference of the tubular member 46 and sets on the lower horizontal closure portion 48 of the demister assembly 36. Since the demister assembly 36 is supported by the condenser assembly 33 the central locking and inlet assembly 35 is vertically affixed by the spacing nut 47. A preheating section 49 comprising a plurality of perforated circular disc baffles 50 is located approximately midway on the tubular member 46 and above the spacing nut 47. The filter chamber 51 is an outer concentric cylinder around the tubular member 46 having a closure portion 86 above the preheat baffles 50. The chamber 51 has apertures 52 high on its circumferential outer wall 53 to permit water to pass out of the chamber 51. A plug 54 blocks off flow through the tubular member 46 between the preheat baffles 50 and filter chamber 51. Circumferential passages 55, 56 permitting steam, and circumferential passages 57, 58 permitting water, to pass through are located in the tubular member 46 within the boiler 34 and preheating section 49. A series of circumferential passages 59 are located in the tubular member 46 above the plug 54 in the filter chamber 51. The top of the tubular member 46 engages the inlet feed water funnel 31. A bail 60 with a water inlet tube holder 30 is affixed to the top of the filter chamber 51. The bail 60 may be hooked by means 61 from above.

The central locking and inlet assembly 35 is locked to the boiler 34 by two pins 95 projecting inwardly from the lower end of tubular member 46 to engage the boiler lug 37. Lug 37 has opposing slots 96 and two helical grooves 97 which end in a fish hook curve 98 to provide a detent action for the pins of member 46. The engaging action imparts an upward thrust to the boiler 34. This upward thrust serves to provide the sealing action between the boiler lip 44 and the resilient seal 70 contained in the support base 45 of the condenser assembly 33. This upward thrust is overcome by the combined action of the adjusting nut 47, which engages the horizontal member 48 of assembly 36, tending to force it down, and the condenser assembly 33 which is forced down by the action of horizontal member 75 of assembly 36. The variations in production tolerance of the assembly are overcome by the adjusting nut 47 and the spring action of member 75. The fastening action, then, is completed when the locking assembly 35 has been pushed down to engage lug 37, and a 90° rotation is imparted to the assembly 35.

The demister assembly 36 has a short sleeve 62 at its base into which the lower part of the tubular member 46 slides through; a cylindrical encasing referred to as the inner cylinder 63 because of its relationship to the condenser cylinder which encloses the preheating section 49 and filtering chamber 51 of the inlet assembly 35; and an annular disc 75 which shoulders the condenser assembly 33 and terminates in a vertically deposed collar 64 which overhangs the condenser assembly 33. A channel 65 is formed between the outer filter chamber wall 53 and the inner cylinder 63. The sleeve 62 secures the splash screen 43 and the lower horizontal portion 48 of the inner cylinder 63 is capable of supporting the inlet assembly 35. Apertures 87 match the circumferential passages 55 in the tubular member 46. A plurality of circular disc-like perforated baffles 67 of equal size extend outward from the inner cylinder 63 to the condensation chamber inner wall referred to as the intermediate cylinder 68. A larger baffle 69 is positioned high enough on the inner cylinder 63 to be above the top of the condensation chamber inner wall 68.

The drum-like condenser assembly 33 has an annular shoulder base 45 which clamps over the boiler lip 44. A soft seal 70 makes the connection steam tight. An aperture 71 is located near the base of the condenser assembly 33 into the conductivity cell 18 is secured.

A U-shaped circular condensation chamber 72 is formed by the inside of the condenser assembly outer cylinder 73, the intermediate cylinder 68 and the U-shaped base 74. The disc 75 of the demister assembly 36 closes off the chamber 72. Apertures 96 are protected by the overhang 64. A product water drain 73 runs from the base 74 of the chamber 72 to the conductivity cell 18. The condenser assembly 33 has a spiral open trough 32 around the outside beginning with connection 76 for the cooling water input tubing 14 and terminating with connection 77 for the output tube 39.

The water quality monitor 19 which is connected to the conductivity cell 18 by means of a cable 21 is a battery powered electronic instrument that continuously monitors the product water quality.

When the distillation unit 15 is to be stored or transported, it may be placed in an autoclave assembly 78 having upper 79 and lower 80 portions with means 81 to clamp the two. The autoclave upper portion 79 has a pressure release valve 82 and a handle 83. Foam cushions 85 may be placed in the autoclave assembly 78 above and below the unit 15 to protect it. Tubing 13, 14 may be placed in the boiler 34 for storage.

In operation, water from the feedwater bag 11 flows through the feedwater tubing 13, through the funnel 31 and into the top portion of the tubular member 46. It passes through the circumferential openings 59 into the bottom of the filter chamber 51 where it is slowly transported to the top during which time particles in the water can settle out. The chamber 51 may be filled with a filtration material for additional filtering action. It is possible to add deionizing material to produce water with very low conductivity or add activated charcoal to control organic material. During residence in this chamber 51 the water is heated to begin release of volatile elements. As the water rises, it passes through apertures 52 in the filter chamber outer wall 53.

The filtered water drops down through the channel 65 into the preheat section 49, where it traverses the perforated baffles 50 step by step being heated from below. A portion of the steam produced in the boiler 34 comes up the central cylinder 46 and out of the circumferential passages 56 over the water on the baffles 50. This steam strips volatile elements from the water, which vent through the channel 65 past the incoming water. In this section 49 heat is also extracted from the condensing assembly 33 to improve thermal efficiency.

The water leaves the preheat section 49 through passages 57 passing into the lower part of the tubular member 46. It enters the boiler 34 through passages 58 at the bottom of the tubular member 46, mixing with and diluting the water in the boiler 34. The splash screen 43 in the boiler 34 minimizes carry-over of water particles to the demister 36 and condenser 33 assemblies. It also suppresses foaming. The vented overflow 40 maintains a constant level of water in the boiler and prevents siphoning.

As steam is produced in the boiler 34, it travels up the tortuous path through the demister baffles 67. Particulate matter is removed from the steam during this process. Some steam is condensed on the demister baffles 67 developing a downward reflux flow for self cleaning. Upon reaching the top of the path of baffles 67, the steam is directed by the large baffle 69 into the condensing chamber 72 where it condenses primarily on the inside of the outer cylinder 73.

Bright polish of the condenser interior and its configuration provide efficient condensation. Protected vents 96 at the top of the condensing chamber 33 discharge noncondensable gasses.

Cooling water passes from the cooling bag 12 through the cooling tube 14 into the helical open trough 32. The gravity water flow through the helical trough 32 provides highly efficient conductive and radiation heat transfer from the interior of the condensing chamber 72. The cooling water passes out of the trough 32 into the cooling water output tube 17. The condensing chamber 72 is easily accessible for cleaning to maintain the high efficiency heat transfer path.

Product water passes through the drain 73 at the base 74 of the condensing chamber 72 through the conductivity cell 18 into the distillate discharge tube 22. The water outlet design is free of any entrapment crevices which could affect purity. The locating of the water drain 73 at the base 74 of the condensing chamber 72 avoids a buildup of salts. The product water is isolated from the feedwater inlet and boiler to assure water purity.

The distillate dischrage tube 22 extends from the conductivity cell 18 at an upward angle of 5°. The distillate flows through the tube 22 and manifold 20 into one of the solution bags in the containers 24.

Since steam seal 70 between the boiler 34 and condenser 33 is the only seal necessary in the entire unit 15, steam loss is held to a minimum.

Placing the conductivity cell 18 in theh product water site assures water purity measurement at a constant temperature while the original purity is maintained at the condensing location.

The distillation unit 15 can operate on any local 18,000 to 36,000 B.t.u. per hour heat source such as a gasoline burner, coal, coke or wood fire or an electric heater.

The unit 15 produces up to one gallon per hour of sterile pyrogen-free water from local water sources, monitors its purity and transfers it to plastic containers for reconstituting intravenous solutions, or for any other pure water use.

Constructed entirely of stainless steel, the unit's durability makes it ideal for parachute delivery in remote areas. Despite this construction, the unit only weighs about 30 lbs.

We claim:

1. A portable distillation system having water supply means, a distillation unit, and a product water receiving means wherein said distillation unit comprises:
    (a) an inlet assembly including
        (i) a tubular member having means secured externally for vertical positioning,
        (ii) means connected to said tubular member for filtering incoming water, and separating the incoming water from the vapor stage of the product water, and
        (iii) means connected to said tubular member for preheating incoming water;
    (b) a demister and condenser assembly including
        (i) inner, outer and intermediate concentrically arranged cylinders,
        (ii) said inner cylinder surrounding said inlet assembly and spaced therefrom and having a closed end surrounding said tubular member below and adjacent said vertical positioning means and horizontally extending baffle means adjacent the opposite end thereof and of greater diameter than said intermediate cylinder and less than said outer cylinder,
        (iv) means connected to said inner cylinder and extensively with said outer cylinder,
        (iv) means connected to said inner cylinder and bridging the space between said inner and intermediate cylinders for filtering steam,
        (v) the lower ends of said intermediate and outer cylinders connected by a U-shaped member forming a closure therebetween, said closure having an outlet for the distillate to pass through,
        (vi) means connected to said outer cylinder for cooling the outer cylinder surface; and
    (c) a circular container including means for supporting said outer cylinder.

2. The portable distillation system recited in claim 1 wherein:
    (a) said tubular member has an internal plug midway of the length thereof and said vertical positioning means is spaced below said plug, and said tubular member has circumferential openings adjacent the upper surfaces of said plug, and circumferential passages between said plugs and said vertical positioning means and below said vertical positioning means;
    (b) said filtering water means comprises a cylindrical member surrounding said tubular member and having a closure portion surrounding said tubular member and coextensive with the upper surface of said plug and below said circumferential openings in said tubular member, said cylindrical member having apertures proximate to the upper end thereof; and
    (c) said preheating means comprises a plurality of vertically spaced discs secured to said tubular member between the lower surfaces of said plug and said vertical positioning means for said tubular member, said discs provided with apertures arranged in vertically nonaligned relation.

3. The portable distillation system recited in claim 1 wherein said support means for said inner cylinder comprises an annular flange extending between said inner cylinder and said outer cylinder at the distal ends of said inner and outer cylinders from said closed end of said inner cylinder and a collar depending from the periphery of said annular flange and engaging the outer surface of said outer cylinder.

4. The portable distillation system recited in claim 1 wherein said filtering steam means comprises a plurality of vertically spaced discs projecting from the outer surface of said inner cylinder and coextensive with the length of said intermediate cylinder and bridging the spaces between said inner and intermediate cylinders, said discs provided with apertures arranged in vertically nonaligned relation.

5. The portable distillation system recited in claim 1 wherein said cooling means comprises a continuous spiral trough secured to the outer surfaces of said outer cylinder and extending the length thereof, inlet and outlet means connected to said spiral trough for directing flow of fluid through said spiral trough.

6. The portable distillation system recited in claim 1 wherein said support means for said outer cylinder comprises an outwardly curved lip terminating the open end of said container, said container dimensioned to receive an annular depending shoulder secured at the lowermost end of said outer cylinder and engaging said lip in sealing relation.

7. The portable distillation system recited in claim 1 wherein said container has an inwardly directed projection adjacent and below the upper extremity of said container, including a perforated closure member extending across said circular container and resting on said inwardly directed projection.

8. The portable distillation system recited in claim 1 wherein said container has an upstanding support pedestal centrally disposed internally on the bottom of said container for engaging the lower end of said tubular member.

9. The portable distillation system recited in claim 1 wherein said container has an aperture, including a removable overflow member engageable in said aperture.

10. The portable distillation system recited in claim 1 including a conductivity cell connected in fluid communication to said distillate outlet for monitoring the quality of distillate produced by said distillation unit.

11. A portable distillation unit which comprises:
    (a) an inlet assembly including
        (i) a tubular member having an internal plug midway of the length thereof and means secured externally to said tubular member and spaced below said plug for vertical positioning of said tubular member, and circumferential openings in said tubular member adjacent the upper surface of said plug, (ii) a cylindrical member surrounding said tubular member and having a closure portion surrounding said tubular member and coextensive with the upper surface of said plug and below said circumferential openings in said tubular member, a funnel shaped portion on the end opposite said closure portion connected to the adjacent end of said tubular member and circumferential apertures adjacent said funnel shaped end, (iii) a plurality of vertically spaced discs secured to said tubular member between the lower surface of said plug and said vertical positioning means for said tubular member, said discs provided with apertures arranged in vertically nonaligned relation, and (iv) a plurality of circumferential passages through said tubular member below said plug;

(b) a demister and condenser assembly including (i) inner, outer and intermediate concentrically arranged cylinders, said outer cylinder having an annular depending shoulder secured at the lowermost end of said outer cylinder, (ii) said inner cylinder surrounding said inlet assembly and spaced from said cylindrical member and having a closed end surrounding said tubular member below and adjacent said vertical positioning means and horizontally extending baffle means adjacent the opposite end thereof and of greater diameter than said intermediate cylinder and less than said outer cylinder, (iii) annular flange means extending between said opposite end of said inner cylinder and said outer cylinder at the distal ends of said inner and outer cylinders from said closed end of said inner cylinder and a collar depending from the periphery of said annular flange and engaging the outer surface of said outer cylinder, (iv) a plurality of vertically spaced discs projecting from the outer surface of said inner cylinder and coextensive with the length of said intermediate cylinder and bridging the space between said inner and intermediate cylinders, said discs provided with apertures arranged in vertically nonaligned relation, (v) a U-shaped member connecting the lower ends of said intermediate and outer cylinders and forming a closure therebetween said U-shaped member having an outlet, (vi) a continuous spiral trough secured to the outer surface of said outer cylinder and extending the length thereof, inlet and outlet means connected to said spiral trough for directing flow of fluid through said spiral trough; and (c) a circular container including an outwardly curved lip terminating the open end thereof and an inwardly directed projection adjacent and below said lip, said container dimensioned to receive said annular depending shoulder of said outer cylinder which engages said lip in sealing relation, a perforated closure member extending across said circular container and resting on said inwardly directed projection, an upstanding support pedestal centrally disposed internally on the bottom of said container for engaging the end of said tubular member opposite the end connected to said funnel-shaped portion and removable overflow means for said circular container including venting means; and (d) a conductivity cell connected in fluid communication with said outlet of said U-shaped member for monitoring the quality of distillate produced by said distillation unit.

12. The portable distillation unit recited in claim 11 wherein said inner cylinder has a disc projecting from the outer surface of said inner cylinder and positioned above the top of said intermediate cylinder and extending outwardly above the upper end of said intermediate cylinder and into the space between said intermediate and outer cylinders.

References Cited

UNITED STATES PATENTS

| | | | |
|---|---|---|---|
| 748,564 | 12/1903 | Stocker | 202—187 |
| 662,765 | 11/1900 | Chase | 203—DIG 17 |
| 3,235,469 | 2/1966 | Parke | 203—10 |
| 2,383,294 | 8/1945 | De Stefano | 202—187 |
| 845,929 | 3/1907 | Broonoppolito | 202—176 |
| 3,428,556 | 2/1969 | Gunther | 202—176 |
| 3,249,438 | 5/1966 | Topol | 202—176 |
| 3,635,799 | 1/1972 | Lowi, Jr. | 202—176 |
| 3,497,422 | 2/1970 | Levife | 202—187 |
| 3,507,753 | 4/1970 | Jacuzzi | 203—10 |
| 2,956,934 | 10/1960 | Waddill | 202—197 |

WILBUR L. BASCOMB, JR., Primary Examiner

U.S. Cl. X.R.

202—185 E, 187, 176, 177, 197, 200; 203— 3, 10, 40